Patented June 20, 1944

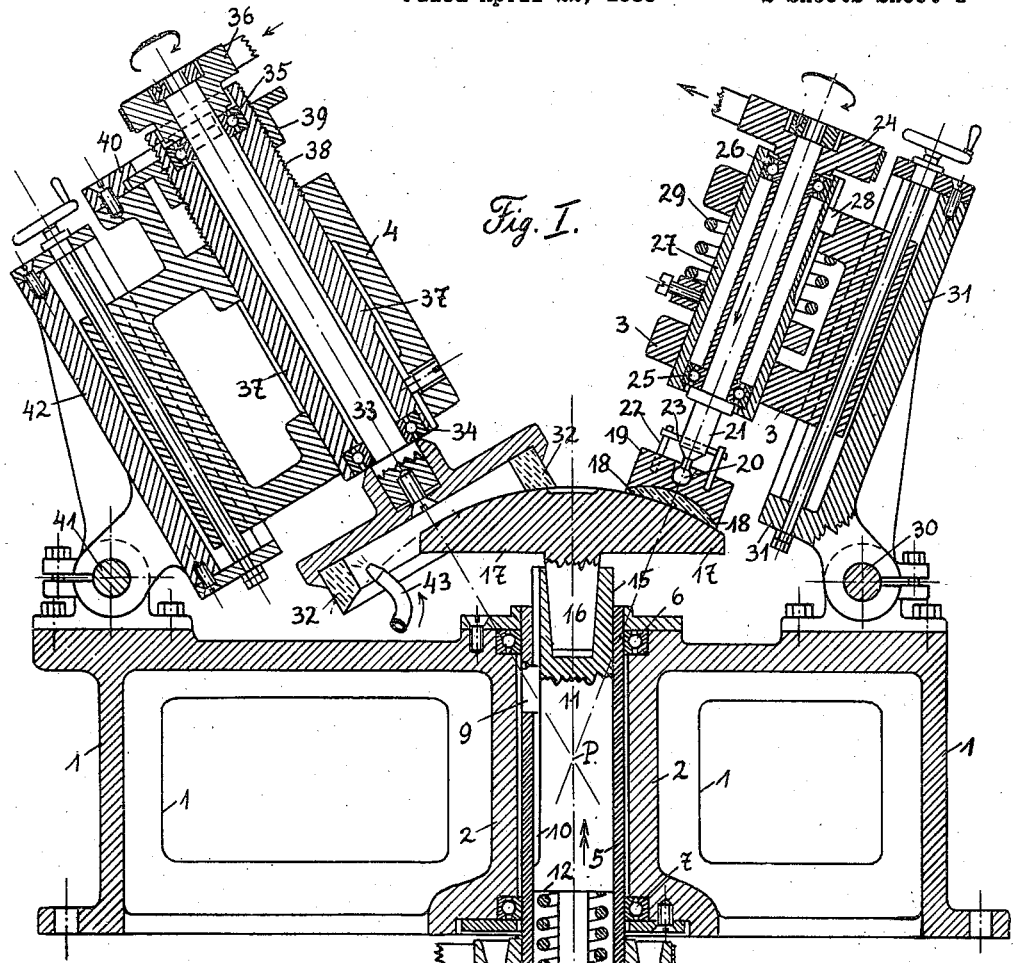

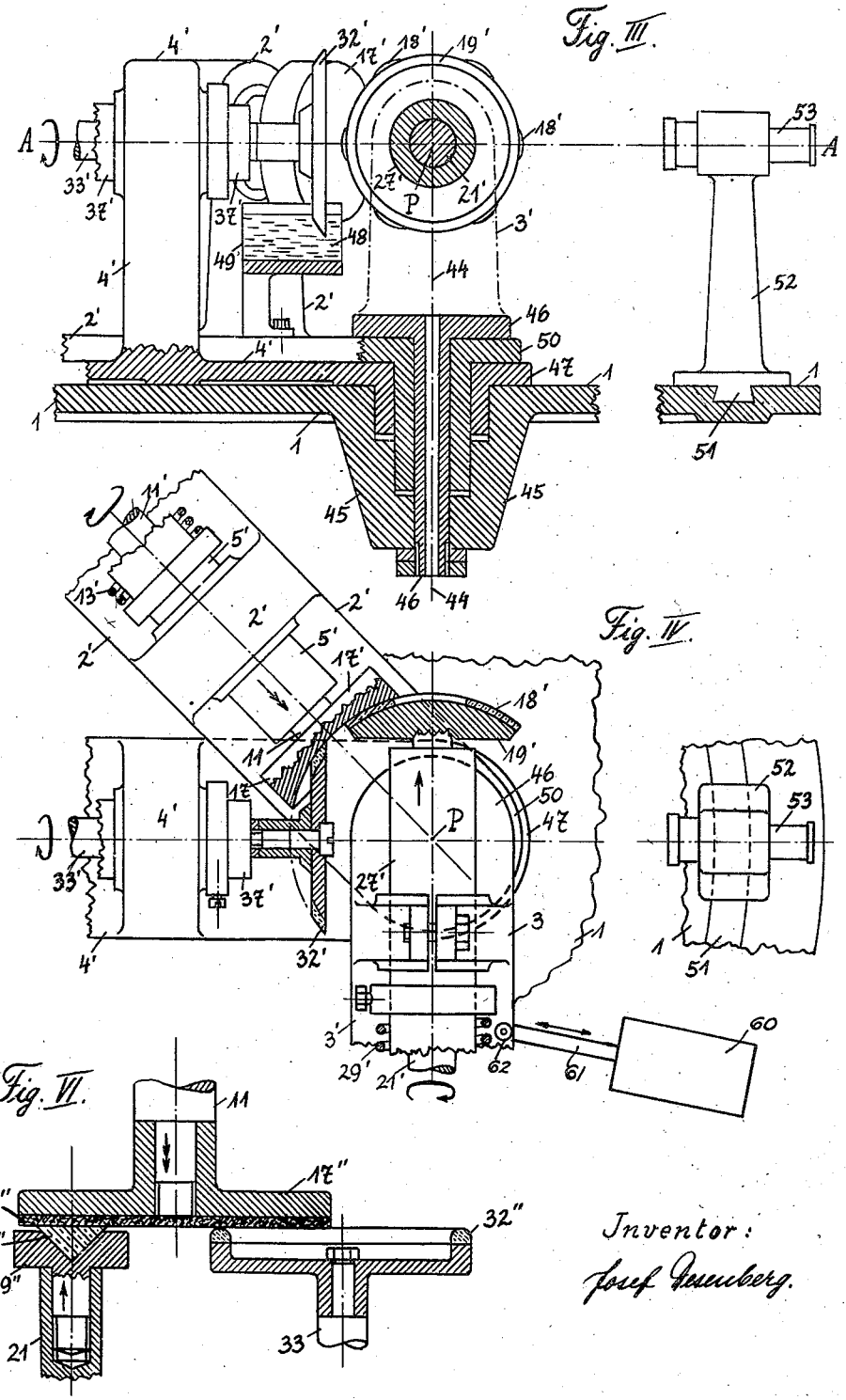

2,352,146

UNITED STATES PATENT OFFICE 2,352,146

GRINDING AND POLISHING MACHINE

Josef Desenberg, Rockford, Ill., assignor to W. F. and John Barnes Company, Rockford, Ill., a corporation of Illinois Application April 22, 1939, Serial No. 269,422
In Switzerland March 2, 1939

20 Claims. (Cl. 51—131)

This invention relates to improvements in or relating to machines for grinding or polishing spherical and plane surfaces, especially lenses and other objects used for optical purposes and consists generally in systematically, accurately and automatically maintaining the position, form, or action of the tool.

One important object of this invention is to provide one or more rotating truing tools not in contact with the lens, but in uniform facial that is, areal contact with the principal working tool.

Another object of this invention is to provide such a device with one or more rotating truing tools in such a position, that the axis of rotation of the tool or tools passes through the optical center, so that the axes of rotation of the workholder, the principal working tool and the truing tool or tools intersect at the optical center as exactly as possible.

A further object of the invention is to simplify and improve machines of the kind in question, whereby the usual oscillating movements between the principal tool and the lenses, which are especially usual in polishing, can be relatively slow or altogether omitted in consequence of the uniform facial contact and working between the truing tool and the principal or working tool. Therefore the speed and working effect is greatly accelerated, which is highly desirable for high precision optical work.

Another object of this invention is to arrange the rotating truing tool in an axially fixed position, and to press one or more principal working tools in an axial direction against the rotating truing tool and to press one or more work-holders in an axial direction against the rotating principal tool.

Another object of the present invention is to precisely adjust the machine and its radius of curvature by means of axial movements of the truing tool, whereby the desired radius of curvature is fixed at once for all spindles of this machine.

Another object of the invention is to provide a rotating truing tool with an active working surface and to have its position maintained as exactly as possible, so that the principal tool and the lenses may be reduced in thickness to a considerable extent and yet maintain the radius of curvature constant.

A further object of the invention is to provide a device which enables the speed, pressure and other factors between the surface of the rotating truing tool and the principal tool to be greater than between the principal tool and the lenses, so that the correcting influence of the rotating truing tool is greater than the deforming influence tending to wear out the surface of the principal tool.

A further practical and important object of this invention resides in the use of loose grinding or polishing grains and, especially when polishing optical surfaces, in the construction of means for the supply of these grains in such a manner, that the truing tool spreads out and distributes these grains uniformly over the principal working tool, before they arrive at the lenses.

Another object of the present invention is the provision of a machine design, which will automatically correct the action of wearing out the surface of the truing tool, whereby the radius of curvature of the truing tool and also that of the principal tool and of the lenses will always be maintained.

With these and other objects in view the invention resides in the novel features of construction, combination and arrangement of parts as hereinafter fully set forth, illustrated in the accompanying drawings and specifically pointed out in the appended claims. It will be understood that modifications and substitutions of equivalent means in the specific details of construction, shown and described within the scope of the claims, may be made without departing from the scope of the invention.

Referring to the drawings:

Fig. I is a front sectional elevation of a machine according to this invention for the production of concave lenses;

Fig. II is a similar, sectional, partial view of a machine for the production of convex lenses;

Fig. III is a partial view, partly in section, of a modification of a machine according to the invention with horizontal spindles;

Fig. IV is a sectional plan view of Fig. III;

Fig. V is a diagrammatic illustration of a scheme for adjusting the machine by means of a telescope; and Fig. VI is a vertical, sectional view of the tools, work-holder and work illustrating the manner in which a plane surface of a prism is worked.

In the drawings, the numeral 1 designates the base of the machine in which three spindle-holders 2, 3 and 4 are mounted.

In the spindle-holder 2 the hollow shaft 5 is rotatably mounted in two ball bearings 6, 7 and provided with a driving pulley 8 which is rotated at a high speed. In the hollow shaft 5 is fixed a key 9 sliding in a keyway 10 of the tool spindle 11. The spindle 11 is axially movable and has a shoulder 12, on which bears the spiral spring 13. Into the shaft 5 is screwed an adjusting plug 14 for adjusting the spring pressure. The upper end 15 of the spindle 11 has a conical opening receiving the lower end 16 of the principal working tool 17.

In the spindle-holder 3, the lens 18 is fastened on the holder 19 which engages, by means of a universal joint 20 and pins 22 and 23, with the rotating work spindle 21. The spindle 21 is driven at a relatively low speed by a pulley 24 and is mounted in two ball bearings 25, 26, which are in turn mounted in the tube 27. This tube 27 is axially movable but kept from turning relative to the holder 3 by means of a key 28, and is acted upon by a spiral spring 29 so as to be urged in the direction toward the principal working tool 17.

The axis of the spindle-holder 3 is permanently directed toward the central point P which is the center of curvature of the principal working tool and the optical center of the lens 18 at the same time. This holder is swingable about a pivot 30 of a support 31 for rocking adjustment about said support through any desired angle of inclination to the axis of the principal tool, the holder 3 being slidably arranged on said support.

On the spindle-holder 4 the truing tool 32 is fastened on a rotatable spindle 33, mounted on ball bearings 34, 35 and driven preferably at a speed even higher than that of spindle 5 by a pulley 36. The ball bearings 34, 35 are fixed in a tube 37, which is displaceable in usual manner and exactly adjustable in the axial direction by means of fine thread 38 and an adjusting ring 39 engaging with said thread and held in a stationary position relative to the holder 4 by a seating member 40. The tube 37 is mounted in the spindle-holder 4 and is always directed exactly toward the central point P and can be adjusted by swinging about a pivot 41 or by sliding on the support 42.

The grinding or polishing grains are supplied together with water through a tube 43 under pressure to the hollow space of the truing tool 32.

In operating this machine the surface of the principal working tool 17 is permanently and simultaneously in uniform facial contact with the truing tool 32 and with the lens 18, whereby the axes of the spindles 11, 33 and 31 intersect in the optical center P. The truing tool 32 works directly on the principal working tool 17, which therefore constantly has a precise and smooth form of surface and always maintains exactly the desired radius of curvature. If the speed, pressure or the like between the surfaces of the rotating truing tool 32 and the principal tool 17 are greater than those between the principal tool 17 and the work piece 18, the correcting influence of the rotating truing tool 32 will be greater than the deforming influence of the action of wearing out the surface of the lens 18.

It is a characteristic feature of this invention, that the truing tool 32 is rotating in uniform facial contact with the principal tool and that the axis of rotation of the truing tool 32 is directed through the optical center P, whereby the wearing-out action of the principal tool 17 is negligible and without any detrimental effect on the constant form and position of this tool and the precision of the lens 18.

The truing tool 32 may be made of a material, which is very hard or does not wear out much, for example Carboloy, Stellite, fibre, hard rubber, carborundum and many other materials.

In every case it is possible to maintain the working surface of the principal working tool practically perfect in form and position. This is important for the high precision of the lenses which can thus be obtained without the necessity for taking many measurements and interrupting the working a corresponding number of times.

If the truing tool 32 is of a softer material, it is useful to move the adjusting ring 39 so that the working surface of the truing tool 32 is always at an exact distance from the optical center P. It is not difficult to ascertain experimentally how much and how often the adjusting ring 39 must be slightly turned for this purpose, by using a fine scale.

Further it is relatively easy to determine the exact radius of curvature of the lens 18 by moving the adjusting ring 39, whereby in a simple and highly precise way the desired radius of curvature is obtained for all the working surfaces, inclusive of those of the truing tool and the principal tool. By this means the necessity for taking many measurements and consequently frequently interrupting the working, which is a tedious work, is done away with. This result represents a great advantage of the invention.

When changing the machine for other lenses with different radii of curvature it is only necessary to change and determine the position of the truing tool 32.

The whole result is that the process, especially when polishing, is considerably stabilised and improved, whereby a greatly accelerated manufacture is rendered possible, as has been proved in practice.

It is important to note that according to this invention the oscillating movements (with so-called rocking-motions) between the tool 17 and the lens 18 are in many cases unnecessary through the influence of the uniform facial contact between the truing tool 32 and the principal tool 17. The regulation of said oscillating movements has hitherto met with considerable difficulty, due to the amount, smooth application, number, and eccentric position of the movements and the speed, which was very slow, and other reasons.

The speed at which the tool spindles of the machine may be driven is actually limited only by the form and the strength of the tools, so that the manufacture of the lenses can thus be considerably accelerated. These spindles may perform additional slow oscillatory movements, if desired. The functioning of the machine according to this invention in regard to the principal tool and the lens is similar to that described in my Patent No. 2,005,718.

The manufacture of precise and identical lenses was formerly difficult requiring great skill and experience of many years. However, with the machine according to this invention it is possible that even untrained women can produce precise lenses after a short time.

It is a great advantage of the machine according to this invention that, when using loose grinding or polishing grains, the truing tool 32 has the effect of separating and uniformly distributing the grains and the working fluid over the principal working tool 17, before they arrive at the lens 18. For this purpose it is sufficient to feed the grains manually or automatically in or upon the truing tool 32 or upon the principal tool 17 at such a place that the grains come under the influence of the truing tool 32 before they work the lens 18.

As a result of this method, the grains used are prevented from accumulating on the principal tool 17, so that the formation of marks, such as (concentric) rings or zones and scratches, on the lens 18 is avoided, which is highly desirable.

In the grinding process the material of the principal tool 17 may consist as usual, for example of metal, glass, hard rubber and the like.

For the purposes of polishing, it is possible to employ pitch, felt, wood, hard rubber and other natural or artificial materials as the material of the principal tool 17.

With regard to a high speed it is desirable to use a polishing material for the principal tool 17, which is not sensitive to being heated, for example hard felt or hard rubber and the like. It is useful and practically possible, to use the same principal tool 17 for grinding cold and hard and, after the cleaning of the tools and lenses with much water, also for polishing at any moderate temperature and in somewhat plastic condition (cellulose plastics, some synthetic resins, hard rubber and the like). To this end it is unnecessary to change the position of the principal tool 17 or of the work piece 18 or that of the respective holder, which is important for the further perfection of the lenses and for the automatic working of the machine.

It is often desired to employ special machines for the grinding, and separate special machines for the polishing of the lenses and also, depending upon requirements, to use the same machine for grinding and polishing purposes after the principal tool 17 has been changed.

Instead of using loose grain materials it may be suitable to use grinding stones or polishing wheels for the tool 17.

The influence of temperature on the exactness of the work, which is considerable, can be minimized so as to be negligible by limiting the setting up of heat or by the use of special material (nickel, nickel-alloys and the like).

In order to obtain maximum precision for a lens to be ground, the limits of the range of highest precision for the optical surface to be produced are ascertained by tentatively adjusting, by means of the precision adjusting ring 39 cooperating with the finely graduated scale referred to above, the truing tool into engagement with said working surface of said principal tool. The average value of the two measurements thus read off will generally indicate the value to be taken into account for obtaining the desired lens-grinding effect of the machine by means of this truing tool with a precision hitherto unheard of.

In Fig. II is illustrated the system of manufacture of a convex lens 18'. In this case the working surface of the truing tool 32' is also convex but the strain on this tool 32' results in this case in tensile stressing of the spindle 33'. Otherwise Fig. II is similar to Fig. I.

Figs. III and IV illustrate a modification of the machine according to the invention. In the central axis 44 of the round table frame 1 is provided a mounting 45, in which is positioned a hollow bearing pin 46 with the lens spindle-holder 3' having a glass-head 19' carried by a work spindle 21' mounted in a surrounding tube 27' which is urged in the upward direction in Fig. 4 by a compression spring 29'. About the pivot 46 is arranged another hollow pivot 47 in connection with the tool spindle-holder 4' and the truing tool 32' guided by a hollow tube 37' and immersed in the working-fluid 48 in the vessel 49. Around the pivot 46 is also positioned a further hollow pivot 50 with the spindle-holder 2 carrying the principal working tool 17' carried by a tool spindle 11' surrounded by a hollow spindle 5'. Between the spindles 5' and 11' a spring 13' is interposed.

In a circular and concentric dovetailed groove 51 is arranged a telescope-holder 52 with the telescope 53.

The central vertical axis 44 is the swinging axis for all the holders 3', 4', 2' and 52 so that the horizontal axes of the glass-holder 19' carrying the lenses 18', of the tool 32', of the principal tool 17' and of the telescope 53 are always exactly directed through the axis 44, situated as precisely as possible in one and the same plane A—A. It will be understood that the positioning of all the spindles in a common plane A—A is preferred but not absolutely necessary.

The lenses 18' and their supporting head 19' are rotated at a low speed, the truing tool 32' rotates at a high speed and is adjusted and fixed in the axial direction, the principal tool 17' is rotated at a high speed and is forced toward truing tool 32' in the axial direction, whereby the lenses are urged against the principal tool 17'.

The axial movements of the principal tool 17' and the lenses 18' can be effected in the usual way (not illustrated) by means of sliding or roller bearings arranged on their spindles. The lenses 18' and the supporting head 19' are, advantageously, free to adjust themselves to the surface of the principal tool 17' rectified by the truing tool 32'. Oscillations may be set up between the principal tool and the work by operatively connecting the lens spindle-holder 3' with a cylinder 60 in which a piston rod 61 is reciprocated in a known manner by means of a correspondingly controlled pressure fluid, the rod being pivotally connected to the holder 3' at 62. By this means the holder 3' oscillates about its axis 44 during the grinding operation.

Fig. V represents a scheme for adjusting the machine illustrated in Figs. III and IV in an easy and precise manner.

The telescope 53 is aligned with one of the adjusting spindles, in this instance the spindle 11. In a hole drilled in the bearing pin 46 is fixed a sight-pin 54, in such a way, that the point of this pin touches the plane A—A. The adjusting spindle carrying the principal tool 17' is carried in such a position that also by axial movement of the spindle to be observed, the middle point of this spindle or of the principal tool is always aligned with the axis of the telescope 53 and with the point of the sight-pin 54. It will be understood that the other spindles 21 and 33 (Fig. I) are one after the other adjusted in the same relative position to the telescope 53 and the sight-pin 54.

Fig. VI illustrates the parallel position of all the spindle axes when manufacturing a plane working surface whereby the optical center P is situated at infinity. The prism 18" is carried on the work-holder 19" and is worked by the principal tool 17", which is in uniform surface contact with the rotating truing tool 32". It is not necessary that all the axes be in one plane.

It will be understood that this invention can be combined with many other methods, machines or apparatus.

A more detailed description of the manner in which the machine is operated will not be necessary, as the operation of the various parts has been set forth in the description. I do not confine myself to the precise construction of parts in this specification, as the parts may be changed, varied and combined with equivalent parts, without departing from the scope and the principle of my invention.

It should be stated that the construction of the machine according to the invention and its mode of operation described above and illustrated in the drawings are only given as suitable examples of means for carrying out the invention.

I claim:

1. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool and in true conformity with said optical surface in spite of wear on said principal tool and said work, and means for mounting said work holder, said principal tool and said truing tool with their axes intersecting each other at the center of curvature of said work.

2. In a machine for producing high precision optical surfaces, a work holder rotatable about its axis, a principal tool having a working surface conforming to the optical surface to be produced on the work and being rotatable about its axis and in areal contact in axial direction with said work at a working pressure, a truing tool rotatable about its axis and having facial working portions cooperating with said working surface of said principal tool at a pressure higher than said working pressure and in true conformity with said optical surface, said truing tool uniformly bearing on said working surface in spite of wear on said principal tool and said work, means for mounting said rotatable work holder, said rotatable principal tool, and said rotatable truing tool with their axes intersecting each other at the center of curvature of said work, adjusting means associated with said truing tool for holding said three different rotatable parts in proper position with their axes intersecting at said center of curvature.

3. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and means associated with said adjusting means for urging said former two rotatable parts into working engagement and fixing in position said truing tool, thereby keeping the radius of curvature of said optical surface substantially constant even with relatively considerable decrease in the thickness of said work and said principal tool arising due to said wear.

4. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and means associated with said adjusting means for so adjusting in addition to said working pressures the working effect between said truing tool and said principal tool and that between said principal tool and said work that the correcting and sharpening effect of the practically non-wearing truing tool on said principal tool is always greater than the deforming effect exerted on said principal tool by the surface of said work.

5. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for moving said work and said principal tool into engagement subsequent to the engagement of said principal tool with said truing tool and for disengaging said work from said principal tool at a predetermined time.

6. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for moving said work and said principal tool out of engagement before the position and the form of said principal tool are changed, and in consequence of which each work piece is finished at the end of the respective working operation with the surface of the principal tool being in exact form.

7. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions co-operating with said working surface of said principal tool at a pressure higher than said working pressure and in true conformity with said optical surface in spite of wear on said principal tool and said work, means for mounting said rotatable work holder, said rotatable principal tool, and said rotatable truing tool with their axes intersecting each other at the center of curvature of said work, and means for oscillating one or more of said three rotatable parts relative to each other, said oscillatory movement being slow relatively to the speeds of said parts.

8. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and means for controlling said adjusting means from a single place to predetermine the precision limits of the optical surface to be produced by placing said truing tool into engagement with said working surface of said principal tool and determining the correct relative adjusting position of said truing tool by averaging between said predetermined limits.

9. In a machine for producing high precision optical surfaces, a universally mounted work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and means for controlling said adjusting means for readjustment of the tools to the radius of curvature of said optical surface in compensation for any axial deviation by a corresponding slight control movement.

10. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for said truing tool for axial coarse adjustment and subsequently for axial fine adjustment of said tool, the control means including a finely interiorly threaded adjusting ring rotatably carried by a mating screw thread on the mounting means of said truing tool.

11. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and means including control means for said adjusting means for fine adjustment of said truing tool in the axial direction automatically to maintain the precise radial distances of the principal tool and the work from the optical center simultaneously with said fine adjustment of the truing tool.

12. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for said truing tool for axial course adjustment and subsequently for axial fine adjustment of said tool, said work holder having a universal joint for holding the work in working engagement with said principal tool, and means for holding said principal tool in precise position relative to said center of curvature by said axial adjustment of the truing tool to maintain the working surface of said principal tool exactly spherical.

13. In a machine for producing high precision optical surfaces, a universally mounted work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surface of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for said truing tool for a plurality of axial adjustments of said tool, the control means including a finely interiorly threaded adjusting ring rotatably carried by a mating screw thread on the mounting means of said truing tool.

14. In a machine for producing high precision optical surfaces, a universally mounted work holder rotatable about its axis, a principal tool having a working surface conforming to the optical surface to be produced on work and being rotatable about its axis and in areal contact with said work at a working pressure, a truing tool rotatable about its axis and having facial working portions cooperating with said working surfaces of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for said truing tool for axial coarse adjustment and subsequently for axial fine adjustment of said tool, said fine adjustment automatically maintaining the precise radial distances of the principal tool and the work from the optical center simultaneously for the whole three part system.

15. In a machine for producing high precision optical surfaces, a work holder rotatable about its axis, a principal tool having a working surface conforming to the optical surface to be produced on the work and being rotatable about its axis and in areal contact with said work at a working pressure, a truing tool rotatable about its axis and having facial working portions cooperating with said working surfaces of said principal tool at a pressure higher than said working pressure and in true conformity with said optical surface in spite of wear on said principal tool and said work, means for axially adjustably mounting said rotatable work holder, said rotatable principal tool, and said rotatable truing tool with their axes intersecting each other at the center of curvature of said work, and control means for said adjusting means for said truing tool to provide for a plurality of axial adjustments of said tool, the control means including a finely interiorly threaded adjusting ring rotatably carried by a mating screw thread on the mounting means of said truing tool, said work holder having a universal joint for holding the work and providing for engagement of said work with said principal tool, means for holding said principal tool in precise position relative to said truing tool by said axial adjustment of the center of curvature to maintain the working surface of said principal tool exactly spherical.

16. A machine for producing optical surfaces comprising a work holder and a plurality of tools each rotatable about their axes, one of said tools having a working surface conforming to the optical surface to be produced and in facial contact with the work, another of said tools comprising a truing tool having facial working portions conforming to said optical surface and in surface contact with the first named tool over a substantial area, means for mounting said work holder and each of said tools with their axes intersecting each other at the center of curvature of said optical surface, and means for simultaneously adjusting said work holder, said first named tool and said truing tool by adjustment of the truing tool to maintain the center of curvature of the working surface of the first named tool coincident with said center of curvature of said optical surface.

17. A machine for producing optical surfaces comprising a work holder and a plurality of tools each rotatable about their axes, one of said tools having a working surface conforming to the optical surface to be produced and in facial contact with the work, another of said tools comprising a truing tool having facial working portions conforming to said optical surface and in surface contact with the first named tool over a substantial area, means for mounting said work holder and each of said tools with their axes intersecting each other at the center of curvature of said optical surface, means for axially adjusting the position of said truing tool to maintain its center of curvature coincident with said center of curvature of said optical surface, and means for resiliently urging said first named tool into contact with said truing tool and the work into contact with the first named tool.

18. A machine for producing optical surfaces comprising a work holder and a plurality of tools each rotatable about their axes, one of said tools having a working surface conforming to the optical surface to be produced and in facial contact with the work, another of said tools comprising a truing tool having facial working portions conforming to said optical surface and in surface contact with the first named tool over a substantial area, means for mounting said work holder and each of said tools with their axes intersecting each other at the center of curvature of said optical surface, means for axially adjusting the position of said truing tool to maintain its center of curvature coincident with said center of curvature of said optical surface, and means for adjusting the axial position of said first named tool and said work holder in accordance with the said adjustment of said truing tool.

19. A machine for producing optical surfaces comprising a work holder and a plurality of tools each rotatable about their axes, one of said tools having a working surface conforming to the optical surface to be produced and in facial contact with the work, another of said tools comprising a truing tool having facial working portions conforming to said optical surface and in surface contact with the first named tool over a substantial area, means for mounting said work holder and each of said tools with their axes intersecting each other at the center of curvature of said optical surface, means for axially adjusting the position of said truing tool to maintain its center of curvature coincident with said center of curvature of said optical surface, said work holder and said first named tool being mounted for axial movement towards each other, spring means urging said first named tool into contact with said truing tool, and spring means urging said work holder towards the first named tool.

20. A machine for producing optical surfaces comprising a work holder and a plurality of tools each rotatable about their axes, one of said tools having a working surface conforming to the optical surface to be produced and in facial contact with the work, another of said tools comprising a truing tool having facial working portions conforming to said optical surface and in surface contact with the first named tool over a substantial area, means for mounting said work holder and each of said tools with their axes intersecting each other at the center of curvature of said optical surface, means for axially adjusting the position of said truing tool to maintain its working portions at a predetermined distance from said center of curvature, said adjusting means including a coarse adjustment and a fine adjustment, and means for adjusting the axial position of said first named tool and said work holder in accordance with the adjustment of said truing tool.

JOSEF DESENBERG.